Patented July 26, 1927.

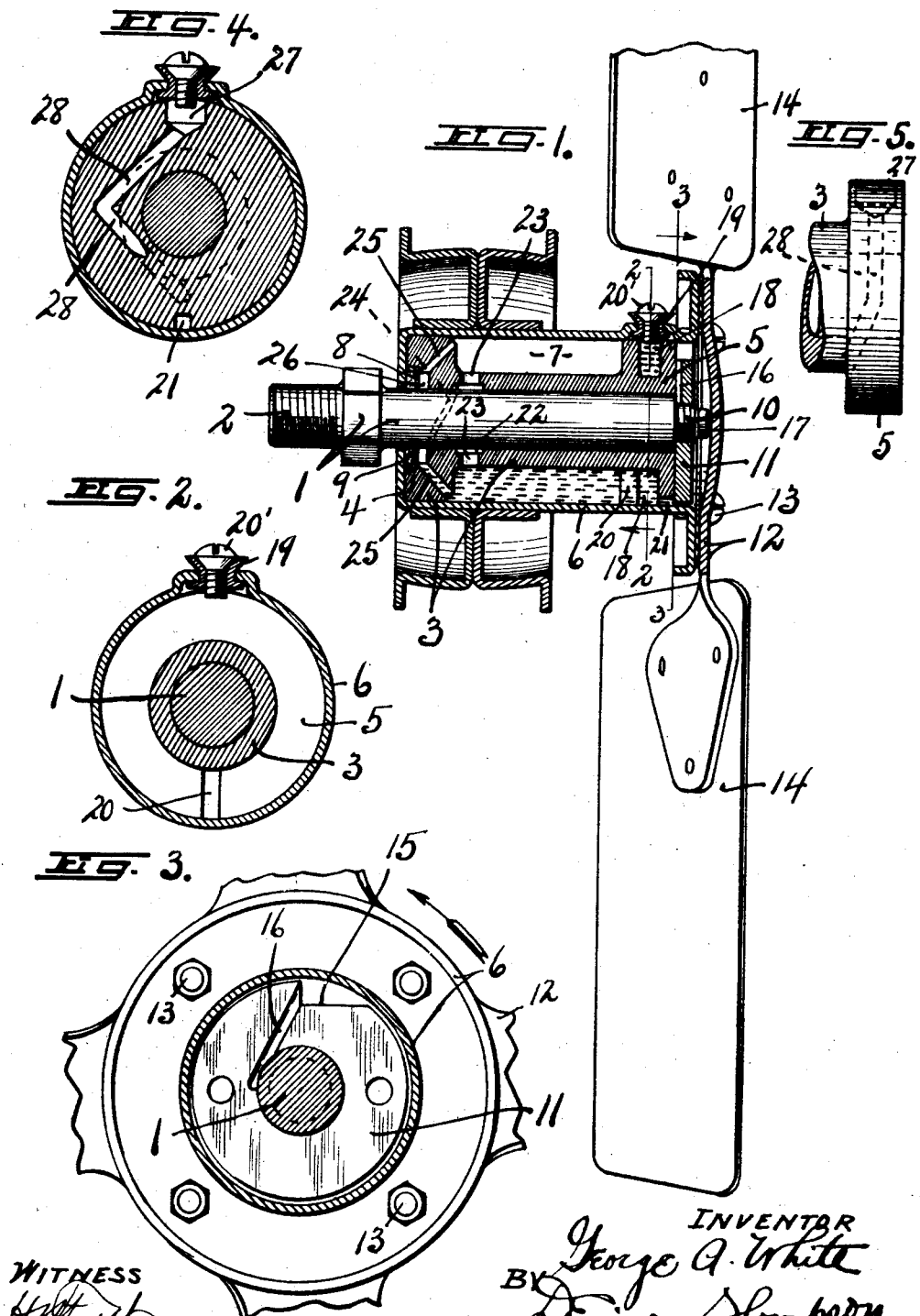

1,637,319

UNITED STATES PATENT OFFICE.

GEORGE A. WHITE, OF JACKSON, MICHIGAN, ASSIGNOR TO THE SPARKS-WITHINGTON COMPANY, OF JACKSON, MICHIGAN, A CORPORATION OF OHIO.

FAN.

Application filed November 3, 1925. Serial No. 66,525.

This invention relates to a certain new and improved fan.

The main object of the invention is to construct a fan of the plain bearing type that is effectively lubricated by a contained lubricating system, the circulation of lubricant through which is maintained by the operation of the fan and the parts of which are so constructed and arranged as to prevent the level of the oil coming higher than a predetermined point, thereby eliminating seepage of oil between the surface of the spindle and the bearing when the oil chamber is provided with its charge of oil.

Other objects and advantages relate to the details of the structure and to the form and relation of the parts thereof, all as will more fully appear from the following description, taken in connection with the accompanying drawings, in which:—

Figure 1 is a sectional view of the fan.

Figure 2 is a section on line 2—2, Figure 1.

Figure 3 is a section on line 3—3, Figure 1.

Figures 4 and 5 are views of a slightly modified form of structure.

The fan structure illustrated in Figures 1 to 3 inclusive comprises a spindle 1 having a threaded end 2 for mounting in any suitable support. An elongated bearing 3 is mounted on the spindle 1 and this bearing, as illustrated, may be formed of a single casting and provided with annular outwardly extending flanges 4 and 5 at its opposite ends, thereby forming an annular groove between the flanges.

The hub 6 which may be formed of sheet metal, and of substantially cylindrical shape, is mounted on the flanges 4 and 5 and secured to them in any suitable manner, as for instance by a pressed fit or by spot welding, and for this reason the external diameter of the flanges 4 and 5 is substantially the same as the internal diameter of the cylindrical hub 6. By this arrangement an annular oil chamber 7 is formed between the hub 6 and the intermediate portion of the bearing 3. The hub 6 at its rear end is formed with an inwardly extending annular flange having a central opening concentric with the spindle 1 and of an internal diameter substantially equal to the external diameter of the adjacent portion of the spindle 1 so as to receive this portion of the spindle and confine the annular cup 8 and the washer 9 of cork or similar material carried by it in a recess in the rear end of the enlarged part 4 of bearing 3. The forward end of the spindle 1 is as shown reduced and threaded, the shoulder formed by the reduction in diameter of the spindle preferably lying substantially flush with the forward surface of the bearing 3. The reduced threaded part 10 is adapted to receive an internally threaded thrust washer 11 of a diameter slightly less than the internal diameter of the hub 6 which hub as shown, has a portion extending forwardly from the bearing 3 for securement to the fan spider 12 in any suitable manner, as by bolts 13, the fan spider carrying the fan blades 14.

The thrust washer 11 is formed with a peripheral recess 15 and a groove 16 in its rear surface leading from the recess 15 to the surface of the spindle 3.

The rear surface of the thrust washer 11 being in contact with the front surface of the bearing 3 prevents any rearward movement of the spindle 1 and as here illustrated, the spindle 1 is formed with a reduced extension 17 extending forwardly from the reduced threaded part 10 and contacting with the inner surface of the fan spider 12 to thereby prevent forward movement of the spindle 1. Thus the spindle is maintained against axial movement with respect to the bearing 3.

For the purpose of limiting the level of oil in the oil chamber 7 or to prevent filling of the chamber beyond a predetermined point, the flange 5 of the bearing 3 is formed with an annular recess or channel 18 in its periphery which is in registration with a filler opening adapted to be closed by a bushing 19 and screw 20' threaded into the bushing. The rear wall of this channel is as shown provided with a cut-away portion which is here illustrated as of rectangular form and of a radial length equal to the depth of the channel 18 which in this illustration extends inwardly to a point conforming with the outer surface of the intermediate portion of the bearing 3 and this cut-away portion forms a passageway 20 leading from the annular groove or channel 18 into the oil chamber or reservoir 7, and this passageway 20 is diametrically opposite the inlet opening through the hub 6.

When it is desired to charge the oil chamber with oil, the screw 20′ is removed and oil is poured through the filler opening and flows around the annular channel 18 and into the oil chamber 7 through the opening 20. As the oil enters the chamber 7 it displaces air which must pass out through opening 20, channel 18 and the inlet opening through the hub 6. When the oil level in chamber 7 has reached the top of the opening 20, no more air can escape and no more oil will enter the chamber and the annular channel 18 is filled with oil. When the chamber is to be filled with oil, the position of the filler opening through hub 6 will naturally be at the top or some point between the top and a few degrees from there and the operation above described will be efficiently carried on under any circumstances when the filler opening is at any position between 45 degrees either side of the vertical position.

By this construction, the amount of oil with which the chamber 7 is charged is limited to a desired amount.

A plain bearing fan of this type when in operation throws the oil centrifugally to the outer portion of the oil chamber and forward wall of channel 18 is provided with a peripheral recess 21 which carries the oil to the peripheral recess 15 in the thrust washer 11. Due to the revolving of the complete bearing and hub, the oil is also revolved and comes to the recess 15 in the periphery of the thrust washer 11 in such a direction that it is forced down the inclined groove 16 which as shown is substantially tangential to the threaded portion 10 of the spindle, and in this manner reaches the surface of the spindle on which the bearing 3 is located. Sufficient pressure is created so that the oil travels in a space between the surface of the spindle 1 and the interior surface of the bearing 3 and finally reaches an annular groove 22 cut in the inner surface of the bearing 3 near its rear end, and this annular groove 22 is in communication with the chamber 7 through one or more, in this instance four radial holes 23 drilled through the bearing 3.

The oil reaching the annular channel 22 is thrown centrifugally outwardly into the chamber 7 and in this manner a continuous circulation of oil is maintained and the oil will be circulated so long as any reaches the recess 15. Any oil that travels rearwardly along the spindle 1 beyond the annular groove 22 is returned to the chamber 7 either by means of a spiral groove 24 cut in the bearing 3 just at the rear of the groove 22, or by means of inclined outwardly extending conduits 25 leading from the chamber 26 to the chamber 7. The hub 6 may be provided with any form of pulley, such as 27 for driving the fan structure.

In Figures 4 and 5 the forward flange 5 of bearing 3 is not provided with an annular channel 18, but instead is formed with a recess 27 registering with the filler opening through hub 6 and an angular drilled passage or conduit 28 leading from the recess 27 through the flange 5 to the chamber 7 and communicating preferably with the chamber at a point diametrically opposite the filler opening and at a height in the chamber 7 dependent upon the extent to which it is desired to fill the chamber with oil.

The structure of Figures 1 to 3 is perhaps preferable in that the air escapes more readily and the oil therefore flows in more easily than in connection with the structure of the other figures in which the flow of the oil is somewhat retarded, due to the necessity of the escape of the air through the drilled passageway 28.

Altho I have shown and described a specific construction of fan and a specific form and relation of the parts thereof, I do not desire to restrict myself to the details of the structure or the parts thereof, as the same may be specifically set forth in the claims hereto appended for the reason that various changes and modifications may be made within the scope of the invention.

I claim:

1. A fan comprising a spindle, a bearing mounted thereon, a hub secured to and having a portion spaced radially from a portion of the bearing to form an oil chamber, and means for feeding oil to said chamber comprising a passageway leading through the bearing opening into the oil chamber at a point more than 90 degrees removed from the inlet opening of the passageway.

2. A fan structure comprising a spindle, an elongated bearing portion mounted thereon, a substantially cylindrical elongated casing portion outside of and spaced from a portion of the bearing, a cross wall at the forward end of the bearing and extending outwardly from the bearing to the casing, a thrust washer mounted on said shaft and having its thrust surface in contact with said cross wall, a fan spider secured to the forward end of said casing at the front of the thrust washer, said thrust washer having a notch in its periphery and a groove leading from the notch to the spindle, and means for feeding oil to the oil chamber between the casing and the bearing comprising a passageway through the bearing opening into the oil chamber at a point more than 90 degrees removed from the inlet opening of the passageway.

3. A fan structure comprising a spindle, an elongated bearing portion mounted thereon, a substantially cylindrical elongated casing portion outside of and spaced from a portion of the bearing, a cross wall at the forward end of the bearing and extending outwardly from the bearing to the casing, a thrust washer mounted on said shaft and having its thrust surface in contact with said cross wall, a fan spider secured to the forward end of said casing at the front of the thrust washer, and means for feeding oil to the oil chamber comprising an opening through the casing and a passageway through the bearing in communication with said opening, said passageway having an opening leading to the oil chamber at a point more than 90 degrees removed from the inlet of the passageway.

4. A fan structure comprising a spindle, an elongated bearing portion mounted thereon, a substantially cylindrical elongated casing portion outside of and spaced from a portion of the bearing, a cross wall at the forward end of the bearing and extending outwardly from the bearing to the casing, a thrust washer mounted on said shaft and having its thrust surface in contact with said cross wall, a fan spider secured to the forward end of said casing at the front of the thrust washer, said thrust washer having a notch in its periphery and a groove leading from the notch to the spindle, and means for feeding oil to the oil chamber comprising an opening through the casing and a passageway through the bearing in communication with said opening and leading into the oil chamber at a point substantially diametrically opposite the opening through the casing.

5. A fan comprising a spindle, an elongated bearing mounted thereon and formed with annular flanges at its opposite ends determining an intermediate annular groove, a casing enclosing the bearing and forming with said annular groove an oil chamber, and means permitting the supply of oil to said chamber comprising a passageway leading through one of said flanges to said oil chamber and opening into the oil chamber at a point more than 90 degrees removed from the inlet of the passageway, and an opening through the casing in communication with said passage.

6. A fan comprising a spindle, an elongated bearing mounted thereon and formed with annular flanges at its opposite ends determining an intermediate annular groove, a casing enclosing the bearing and forming with said annular groove an oil chamber, and means permitting the supply of oil to said chamber comprising a passageway leading through one of said flanges to said oil chamber and opening into the oil chamber at a point more than 90 degrees removed from the inlet of the passageway, and an opening through the casing in communication with said passage, said bearing formed with an opening leading from the shaft to said oil chamber near the rear portion of the latter.

7. A fan comprising a spindle, an elongated bearing mounted thereon and formed with annular flanges at its opposite ends determining an intermediate annular groove, a casing enclosing the bearing and forming with said annular groove an oil chamber, means permitting the supply of oil to said chamber comprising a passageway leading through one of said flanges to said oil chamber and opening into the oil chamber at a point more than 90 degrees removed from the inlet of the passageway, and an opening through the casing in communication with said passage, said bearing formed with an opening leading from the shaft to said oil chamber near the rear portion of the latter, and a spiral groove in said bearing at the rear of said opening.

8. A fan comprising a spindle, an elongated bearing mounted thereon and formed with annular flanges at its opposite ends determining an intermediate annular groove, a casing enclosing the bearing and forming with said annular groove an oil chamber, means permitting the supply of oil to said chamber comprising a passageway leading through one of said flanges to said oil chamber and opening into the oil chamber at a point more than 90 degrees removed from the inlet of the passageway, and an opening through the casing in communication with said passage, said bearing formed with an opening leading from the shaft to said oil chamber near the rear portion of the latter, a chamber within the bearing at the rear of said opening, and a passageway through the rear flange of the bearing leading from said chamber to the oil chamber.

9. A fan structure comprising a spindle, a bearing mounted thereon, a casing surrounding the bearing and spaced from a portion thereof, and means for feeding oil to the space between the bearing and the casing comprising an opening through the casing, and a passageway in the bearing in communication with said opening and opening into the space between the bearing and casing at a point substantially diametrically opposite the opening in the casing.

In witness whereof I have hereunto set my hand this 20th day of October 1925.

GEORGE A. WHITE.